(12) United States Patent
Hsieh et al.

(10) Patent No.: US 9,455,632 B1
(45) Date of Patent: Sep. 27, 2016

(54) VOLTAGE CONVERTER

(71) Applicant: Excelliance MOS Corporation, Hsinchu County (TW)

(72) Inventors: Meng-Ju Hsieh, Hsinchu County (TW); Pao-Chuan Lin, Hsinchu County (TW)

(73) Assignee: Excelliance MOS Corporation, Hsinchu County (TW)

( * ) Notice: Subject to any disclaimer, the term of this patent is extended or adjusted under 35 U.S.C. 154(b) by 0 days.

(21) Appl. No.: 14/790,010

(22) Filed: Jul. 2, 2015

(30) Foreign Application Priority Data

May 13, 2015 (TW) .............................. 104115226 A

(51) Int. Cl.
*H02M 3/156* (2006.01)
*H02M 3/158* (2006.01)

(52) U.S. Cl.
CPC .................................... *H02M 3/158* (2013.01)

(58) Field of Classification Search
CPC .... H02M 3/156; H02M 3/155; H02M 3/157; H02M 3/158; H02M 2001/0012
USPC .......................................... 323/282–285, 351
See application file for complete search history.

(56) References Cited

U.S. PATENT DOCUMENTS

| 9,058,043 | B2 * | 6/2015 | Lin | ............................ G05F 1/10 |
| 9,134,738 | B2 * | 9/2015 | Lin | .......................... G05F 1/445 |
| 2011/0068759 | A1 | 3/2011 | Kuo | |
| 2011/0234188 | A1 | 9/2011 | Chiu et al. | |
| 2011/0241641 | A1 | 10/2011 | Chen et al. | |
| 2013/0038301 | A1 * | 2/2013 | Ouyang | ................. H02M 3/156 323/271 |
| 2013/0141069 | A1 * | 6/2013 | Li | ........................... G05F 1/575 323/283 |
| 2014/0375286 | A1 | 12/2014 | Jiang et al. | |
| 2015/0091535 | A1 * | 4/2015 | Fan | ..................... H02M 3/1584 323/234 |
| 2015/0381043 | A1 * | 12/2015 | Nguyen | ................. H02M 1/14 323/235 |

FOREIGN PATENT DOCUMENTS

| CN | 104009628 | 8/2014 |
| TW | I457740 | 10/2014 |

OTHER PUBLICATIONS

"Office Action of Taiwan Counterpart Application", issued on Jan. 28, 2016, p. 1-p. 7.

* cited by examiner

*Primary Examiner* — Adolf Berhane
(74) *Attorney, Agent, or Firm* — Jianq Chyun IP Office

(57) ABSTRACT

A voltage converter including a constant turned-on time signal generator, a first transistor, a second transistor, an inductor, a ripple signal compensator, and a ripple injection circuit is provided. The ripple signal compensator is coupled to an output terminal of the voltage converter and a second terminal of the first transistor, and generates an adjusted ripple signal according to a switching voltage on a second terminal of the first transistor and an output signal of the voltage converter. The ripple rejection circuit generates a ripple injection signal according to the adjusted ripple signal. Wherein, the constant turned-on time signal generator generates a first and second driving signals for respectively driving the first and second transistors according to the ripple injection signal.

10 Claims, 4 Drawing Sheets

VOLTAGE CONVERTER

CROSS-REFERENCE TO RELATED APPLICATION

This application claims the priority benefit of Taiwan application serial no. 104115226, filed on May 13, 2015. The entirety of the above-mentioned patent application is hereby incorporated by reference herein and made a part of this specification.

BACKGROUND OF THE INVENTION

1. Field of the Invention

The invention relates to a voltage converter, and particularly relates to a buck-type voltage converter capable of quickly stabilizing an output signal thereof.

2. Description of Related Art

Referring to FIG. 1, FIG. 1 is a circuit diagram of a conventional voltage converter. The conventional voltage converter 100 includes a gate controller 110, a ripple injection circuit 120, amplifiers OP1 and OP2, transistors M1 and M2, capacitors C1 and C2, resistors R1 and R2, and an inductor L1. The gate controller 110 periodically provides driving signals to control a turned-on or turned off state of the transistors M1 and M2, so as to generate an output signal VOUT.

Referring to FIG. 1 and FIG. 2, FIG. 2 is an operation waveform diagram of the gate controller 110 when a load state is changed. When the load state of the voltage converter 100 is changed (for example, changed from a light load to a heavy load), a load current ILOAD is switched from a low current value to a high current value. Correspondingly, voltage values of the output signal VOUT and a feedback signal VFB are decreased along with increase of the load current ILOAD. During such period, the ripple injection circuit 120 generates a ramp signal RAMP according to a magnitude of the feedback signal VFB, and provides the ramp signal RAMP plus the feedback signal VFB to the amplifiers OP1 and OP2, and the amplifier OP2 generates a comparison voltage COMP. The gate controller 110 controls the operation of generating the driving signal according to the comparison voltage COMP.

According to FIG. 2, it is clearly known that in the conventional voltage converter 100, a direct current (DC) component of the ramp signal RAMP is increased along with increasing of a current on the inductor L1 caused by reduction of the load current ILOAD, and a voltage of the feedback signal VFB is decreased along with decreasing of the load current ILOAD. Therefore, the signals (the ramp signal RAMP plus the feedback signal VFB) provided to the amplifiers OP1 and OP2 by the ripple injection circuit 120 do not include a state current reflecting a change of the load state, so that the comparison voltage COMP can't be adjusted in response to a large variation of the load state, which results in a fact that the voltage value of the output signal VOUT is greatly decreased.

SUMMARY OF THE INVENTION

The invention is directed to a voltage converter, which has a fast reaction when a load state is switched, so as to effectively provide a stable output signal.

The invention provides a voltage converter including a constant turned-on time signal generator, a first transistor, a second transistor, an inductor, a ripple signal compensator, and a ripple injection circuit. The constant turned-on time signal generator generates a first driving signal and a second driving signal. The first transistor has a first terminal, a second terminal and a control terminal, where the first terminal receives a power voltage, the control terminal receives the first driving signal, and the second terminal generates a switching voltage. The second transistor has a first terminal, a second terminal and a control terminal. The first terminal of the second transistor is coupled to the second terminal of the first transistor, the control terminal of the second transistor receives the second driving signal, and the second terminal of the second transistor is coupled to a reference ground terminal. The inductor is connected in series between the second terminal of the first transistor and an output terminal of the voltage converter. The voltage converter receives the switching voltage and generates an output signal at the output terminal. The ripple signal compensator is coupled to the output terminal and the second terminal of the first transistor, and generates an adjusted ripple signal according to the switching voltage and the output signal. The ripple rejection circuit is coupled to the ripple signal compensator, and generates a ripple injection signal according to the adjusted ripple signal. Wherein, the constant turned-on time signal generator generates the first driving signal and the second driving signal according to the ripple injection signal and a reference voltage.

In an embodiment of the invention, the ripple signal compensator generates a ramp signal according to the switching voltage and the output signal, and filters the ramp signal to generate a filtered ramp signal, and generates the adjusted ripple signal according to the ramp signal and the filtered ramp signal.

In an embodiment of the invention, the ripple signal compensator generates the adjusted ripple signal by subtracting the filtered ramp signal from the ramp signal.

In an embodiment of the invention, the ripple signal compensator includes a ramp signal generator, a low-pass filter and a subtractor. The ramp signal generator receives the switching voltage and the output signal, and generates the ramp signal according to the switching voltage and the output signal. The low-pass filter is coupled to the ramp signal generator, and filters the ramp signal to generate the filtered ramp signal. The subtractor is coupled to the low-pass filter, and subtracts the filtered ramp signal from the ramp signal to generate the adjusted ripple signal.

In an embodiment of the invention, the voltage converter further includes a comparator. The comparator has a first input terminal and a second input terminal for respectively receiving the reference signal and the ripple input signal, and compares the reference voltage and the ripple injection signal to generate a comparison result. The comparator transmits the comparison result to the constant turned-on time signal generator. The constant turned-on time signal generator generates the first driving signal and the second driving signal according to the comparison result.

In an embodiment of the invention, the voltage converter further includes an amplifier and a capacitor. A first input terminal of the amplifier receives the reference voltage, a second input terminal thereof receive the ripple injection signal, and an output signal thereof is coupled to the first input terminal of the comparator. The capacitor is connected in series between the output terminal of the amplifier and the reference ground terminal.

In an embodiment of the invention, the ripple injection circuit generates a ramp current according to the adjusted ripple signal, and generates the ripple injection signal according to the ramp current.

In an embodiment of the invention, the ripple injection circuit includes a transconductance amplifier, a capacitor, an adder and a reset switch. An input terminal of the transconductance amplifier receives the output signal, another input terminal thereof is coupled to the reference ground terminal, and an output terminal generates the ramp current. A first terminal of the capacitor is coupled to the output terminal of the transconductance amplifier and the constant turned-on time signal generator, a second terminal is coupled to the reference ground terminal, and the capacitor receives the ramp current and generates a ramp voltage at the first terminal. The reset switch is coupled in parallel to the capacitor, and is turned on or turned off according to a control signal. The adder adds the ramp voltage and the output signal to generate the ripple injection signal.

In an embodiment of the invention, a time that the first transistor is turned on according to the first driving signal is constant.

In an embodiment of the invention, the voltage converter further includes a capacitor connected in series between the output terminal and the reference ground terminal.

According to the above description, the invention provides the ripple signal compensator, and in case that the load state is changed, the voltage converter truly transmits a status that the output signal is decreased due to the change of the load state to the constant turned-on time signal generator. In this way, the constant turned-on time signal generator can generate the corresponding driving signal to quickly recover the voltage value of the output signal to a preset target voltage value, so as to improve the performance of the voltage converter.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
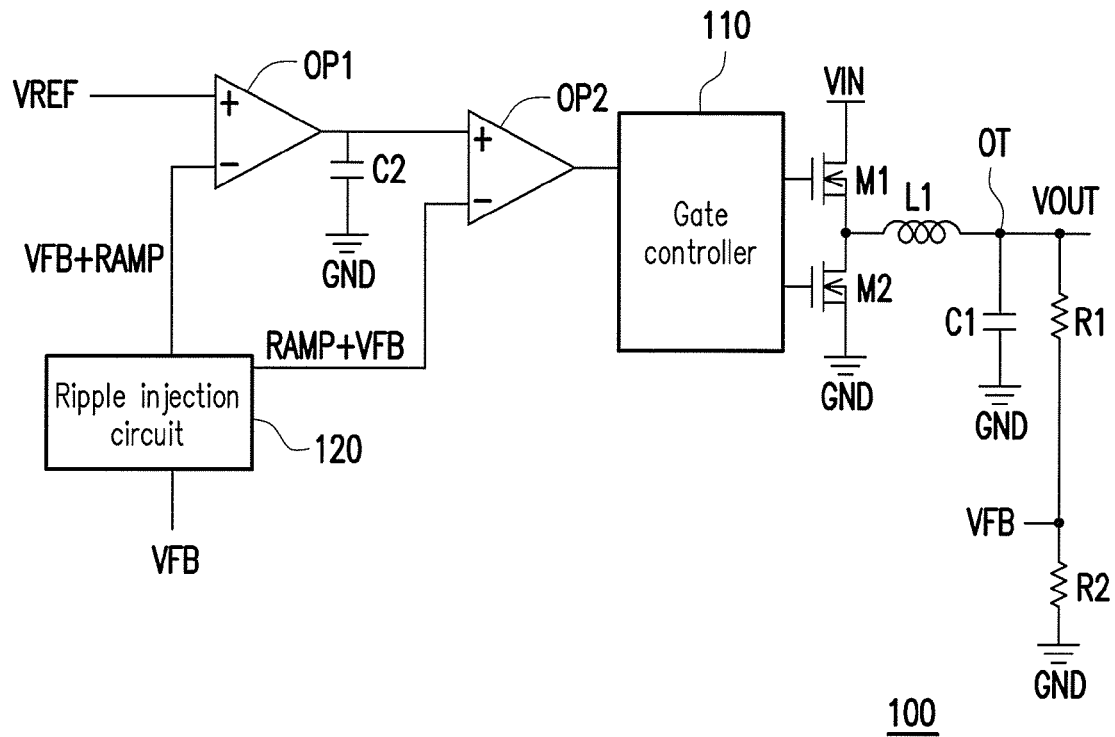
FIG. 1 is a circuit diagram of a conventional voltage converter.
Figure 2:
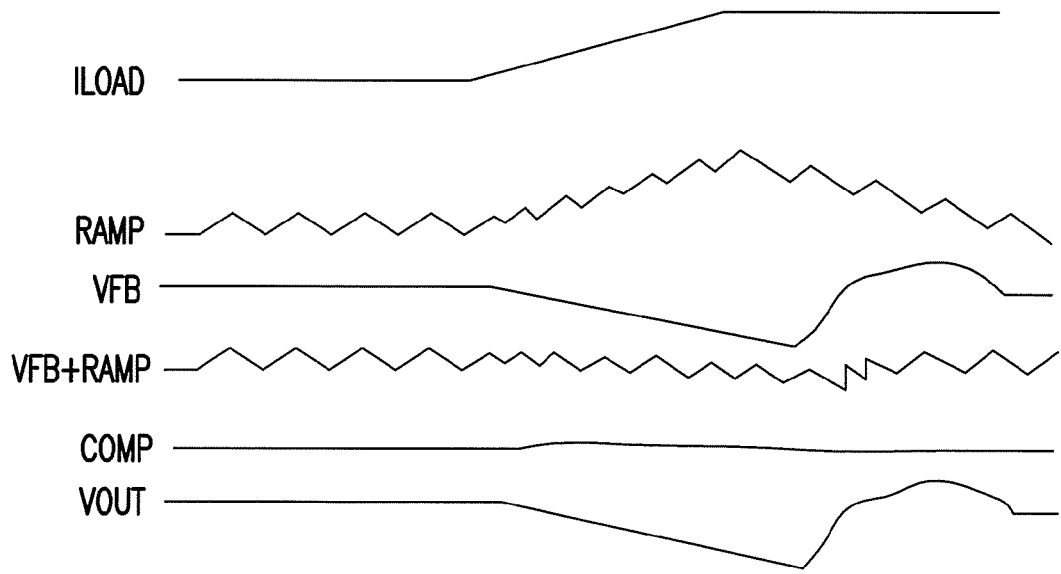
FIG. 2 is an operation waveform diagram of a gate controller 110 when a load state is changed.
Figure 3:
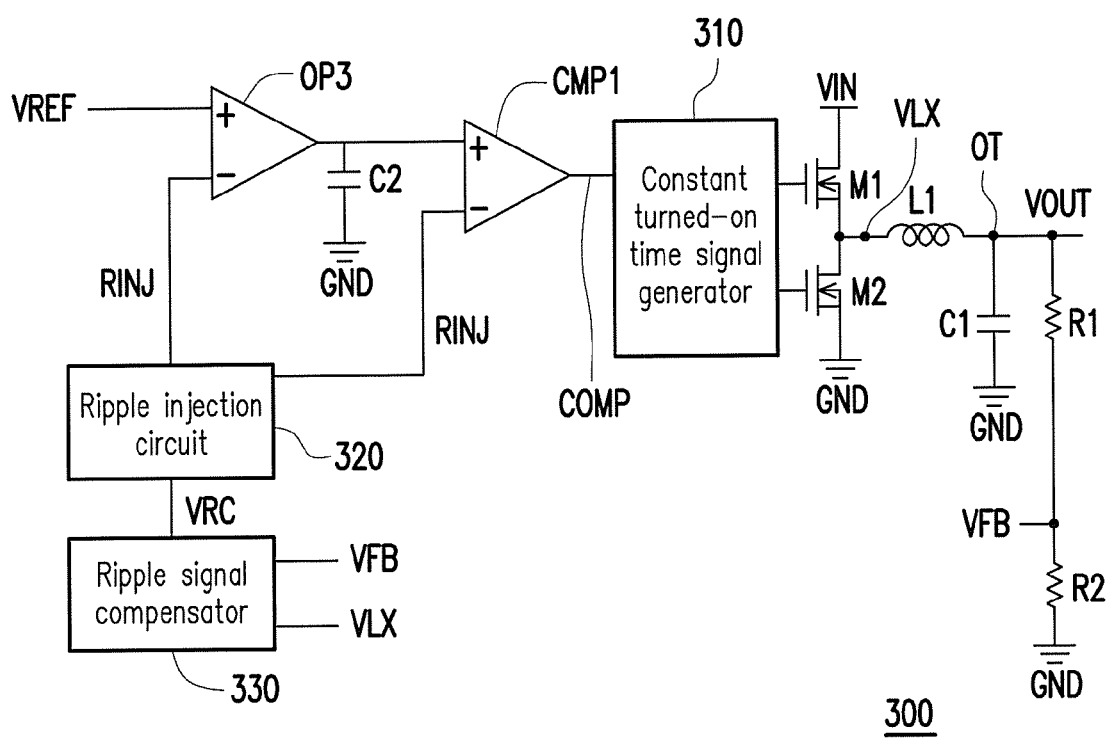
FIG. 3 is a schematic diagram of a voltage converter according to an embodiment of the invention.

Referring to FIG. 3, FIG. 3 is a schematic diagram of a voltage converter according to an embodiment of the invention. The voltage converter 300 includes a constant turned-on time signal generator 310, transistors M1, M2, an inductor L1, a ripple signal compensator 330, and a ripple injection circuit 320. An output signal VOUT is generated at an output terminal OT of the voltage converter 300, where the voltage converter 300 can be a buck voltage converter. A feedback signal VFB is generated according to the output signal VOUT through a voltage-dividing circuit formed by the resistors R1 and R2. The constant turned-on time signal generator 310 provides driving signals to control terminals (for example, gates) of the transistors M1 and M2 for controlling a turned-on state or a turned-off state of the transistors M1 and M2. The transistors M1 and M2 are sequentially connected in series between a power voltage VIN and a reference ground terminal GND. A first terminal of the transistor M1 receives the power voltage VIN, a second terminal thereof is coupled to the inductor L1, and the second terminal is used for generating a switching voltage VLX. A second terminal of the transistor M2 is coupled to the reference ground terminal GND, and the first terminal thereof is coupled to the inductor L1, and the first terminal is used for generating the switching voltage VLX. One terminal of the inductor L1 that is not coupled to the transistors M1 and M2 is coupled to the output terminal OT and generates the output signal VOUT. Moreover, a capacitor C1 is coupled in series between the output terminal OT and the reference ground terminal GND.

Input terminals of an amplifier OP3 respectively receive a reference voltage VREF and a ripple injection signal RINJ provided by the ripple injection circuit 320. A capacitor C2 is coupled between the reference ground terminal GND and an output terminal of the amplifier OP3, and the amplifier OP3 and the capacitor C2 are used to form an integration circuit. A comparator CMP1 receives and compares the ripple injection signal RINJ and a voltage at the output terminal of the amplifier OP3 to generate a comparison signal COMP, wherein the constant turned-on time signal generator 310 generates the driving signals for controlling the transistors M1 and M2 according to the comparison signal COMP.

The ripple signal compensator 330 is coupled to the output terminal OT and the second terminal of the transistor M1, and generates an adjusted ripple signal VRC according to the switching voltage VLX and the feedback signal VFB generated based on the output signal VOUT. The ripple rejection circuit 320 is coupled to the ripple signal compensator 330, and generates the ripple injection signal RINJ according to the adjusted ripple signal VRC.

Figure 4A:
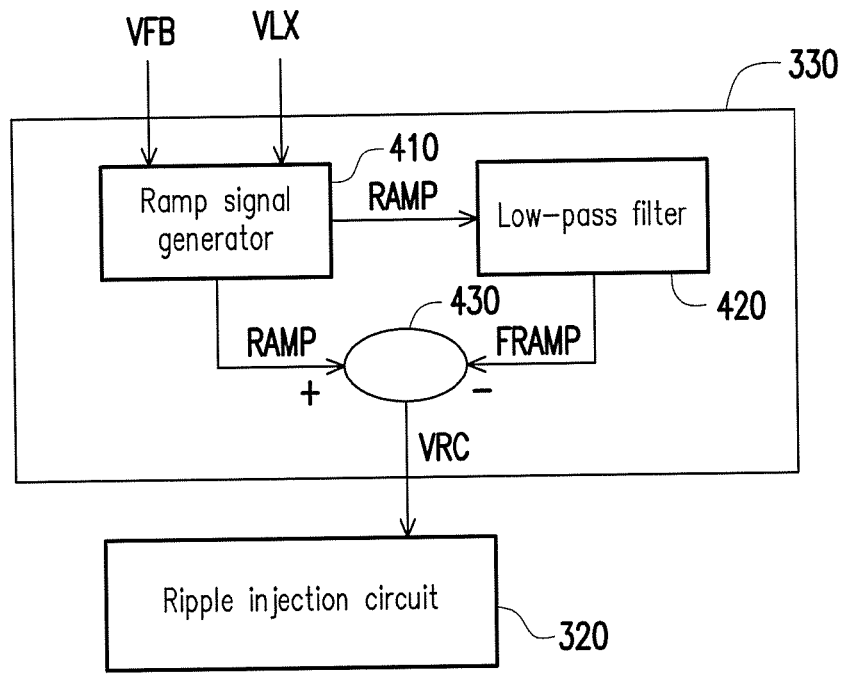
FIG. 4A is a schematic diagram of an implementation of a ripple signal compensator 330.

Referring to FIG. 4A for implementation detail of the ripple signal compensator 330, and FIG. 4A is a schematic diagram of an implementation of the ripple signal compensator 330. The ripple signal compensator 330 includes a ramp signal generator 410, a low-pass filter 420 and a subtractor 430. The ramp signal generator 410 receives the feedback signal VFB and the switching voltage VLX, where the feedback signal VFB is generated according to the output signal VOUT. The ramp signal generator 410 generates a ramp signal RAMP according to the switching voltage VLX and the feedback signal VFB, and transmits the ramp signal RAMP to the low-pass filter 420 and the subtractor 430. It should be noticed that the ramp signal RAMP has a ripple component. The low-pass filter 420 filters a high frequency component of the ramp signal RAMP, i.e. the ripple component of the ramp signal RAMP, and generates a filtered ramp signal FRAMP.

Moreover, the filtered ramp signal FRAMP is provided to the subtractor 430. The subtractor 430 subtracts the filtered ramp signal FRAMP from the ramp signal RAMP to generate the adjusted ripple signal VRC. To be specific, the subtractor 430 subtracts the low frequency component in the ramp signal RAMP to generate the adjusted ripple signal VRC.

Figure 4B:
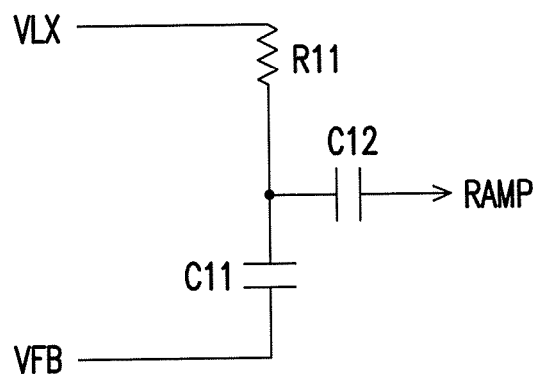
FIG. 4B is a schematic diagram of an implementation of the ramp signal generator 410.

Moreover, referring to FIG. 4B, FIG. 4B is a schematic diagram of an implementation of the ramp signal generator 410. The ramp signal generator 410 includes a resistor R11, capacitors C11 and C12. On end of the resistor R11 receives the switching voltage VLX, and another end thereof is coupled to a common coupling terminal of the capacitors C11 and C12. One terminal of the capacitor C11 that is not coupled to the resistor R11 receives the feedback signal VFB, and one terminal of the capacitor C12 that is not coupled to the resistor R11 generates the ramp signal RAMP.

Figure 5:
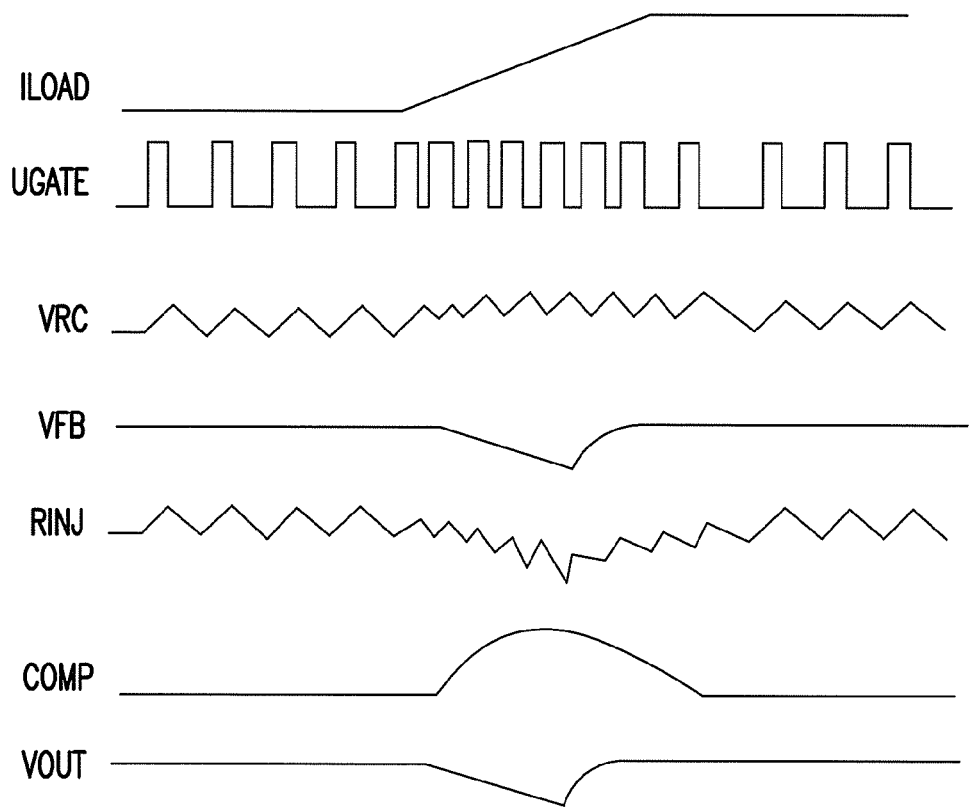
FIG. 5 is an operation waveform diagram of a voltage converter 300 when a load state is changed according to an embodiment of the invention.

Referring to FIG. 3, FIG. 4A and FIG. 5 for operation details of the voltage converter 300, and FIG. 5 is an operation waveform diagram of the voltage converter 300 when a load state is changed according to an embodiment of the invention. When the load state is changed from a light load to a heavy load, a current ILOAD is increased, and a switching period of a driving signal UGATE used for driving the transistor M1 is shortened to make the transistor M1 to keep a constant turned-on time. Now, the ramp signal generator 410 generates the ramp signal RAMP having a ripple at a rising edge according to the switching voltage VLX and the feedback signal VFB. Through the operations of the low-pass filter 420 and the subtractor 430, in the adjusted ripple signal VRC generated by the ripple signal compensator 330, a low frequency ramp component is filtered, and only a ripple component is remained, as shown in FIG. 5.

In this way, the ripple injection signal RINJ generated by the ripple injection circuit 320 by adding the adjusted ramp signal VRC and the feedback signal VFB can retain a descending trend of the output signal VOUT, and such descending trend can be effectively provided to the comparator CMP1 for performing comparison, so as to generate the comparison signal COMP. According to FIG. 5, it is known that the comparison signal COMP has a substantial response for the descending trend of the output signal VOUT (which is equivalent to the descending trend of the feedback signal VFB), and controls the constant turned-on time signal generator 310 to generate the corresponding driving signal UGATE, so as to quickly increase the voltage value of the output signal VOUT.

Figure 6:
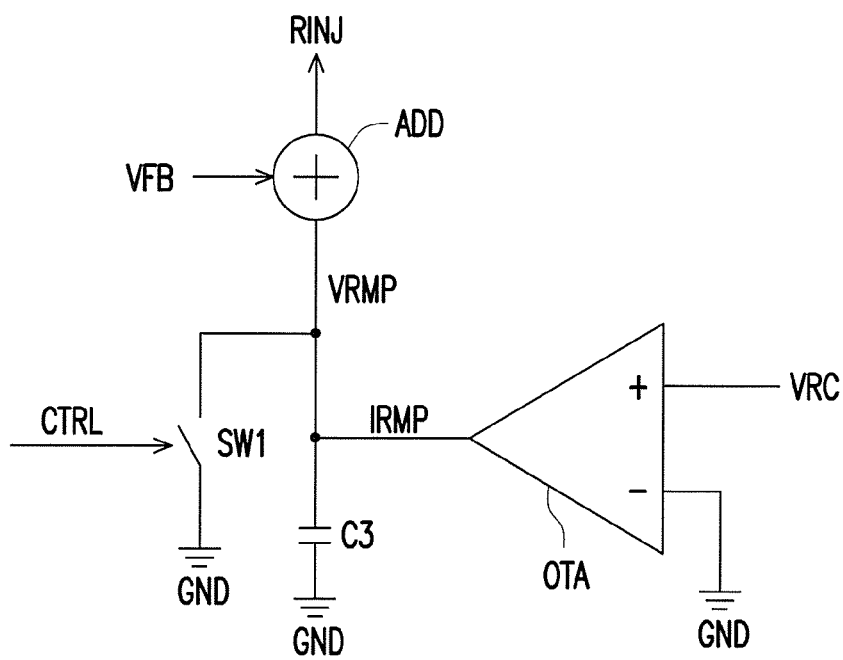
FIG. 6 is a schematic diagram of an implementation of the ripple injection circuit according to an embodiment of the invention.

Referring to FIG. 6, FIG. 6 is a schematic diagram of an implementation of the ripple injection circuit according to an embodiment of the invention. The ripple injection circuit 600 includes a transconductance amplifier OTA, a capacitor C3, a reset switch SW1 and an adder ADD. An input terminal of the transconductance amplifier OTA receives the adjusted ripple signal VRC, another input terminal of the transconductance amplifier OTA is coupled to the reference ground terminal GND, and an output terminal of the transconductance amplifier OTA generates a ramp current IRMP. Namely, the transconductance amplifier OTA in the ripple injection circuit 600 captures the ripple part of the adjusted ripple signal VRC, and converts the captured ripple part into the ramp current IRMP. The capacitor C3 is coupled to the output terminal of the transconductance amplifier OTA for receiving the ramp current IRMP for charging, so as to generate a ramp voltage VRMP.

It should be noticed that one terminal of the reset switch SW1 is coupled to the output terminal of the transconductance amplifier OTA, and another terminal thereof is coupled to the reference ground voltage GND. The reset switch SW1 is turned on or turned off according to the control signal CTRL, and when the reset switch SW1 is turned on according to the control signal CTRL, charges in the capacitor C3 can be discharged through the turned-on reset switch SW1, and a voltage difference of the two ends of the capacitor C3 can be maintained to zero before a next ramp current IRMP is received. Since the ripple part of the adjusted ripple signal VRC is periodically generated, the ramp current IRMP is also periodically generated, and therefore turning-on/off operations of the reset switch SW1 are periodically implemented in alternation.

The adder ADD adds the ramp voltage VRMP and the feedback signal VFB to generate the ripple injection signal RINJ. It should be noticed that since the adjusted ripple signal VRC generated by the ripple signal compensator of the previous stage does not have the low frequency ramp component, the ripple injection signal RINJ generated by the adder ADD may carry a voltage descending state of the feedback signal VFB due to a change of the load state.

In summary, the invention provides the ripple signal compensator to generate the adjusted ripple signal, and the ripple injection circuit generates the ripple injection signal according to the adjusted ripple signal. In this way, a change of the load state can be effectively reflected to the constant turned-on time signal generator. The constant turned-on time signal generator can dynamically adjust the driving signal in response to the change of the load state, so as to provide more stable output signal.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A voltage converter, comprising:
   a constant turned-on time signal generator, generating a first driving signal and a second driving signal;
   a first transistor, having a first terminal, a second terminal and a control terminal, wherein the first terminal receives a power voltage, the control terminal receives the first driving signal, and the second terminal generates a switching voltage;
   a second transistor, having a first terminal, a second terminal and a control terminal, wherein the first terminal of the second transistor is coupled to the second terminal of the first transistor, the control terminal of the second transistor receives the second driving signal, and the second terminal of the second transistor is coupled to a reference ground terminal;
   an inductor, connected in series between the second terminal of the first transistor and an output terminal of the voltage converter, wherein the voltage converter receives the switching voltage and generates an output signal at the output terminal;
   a ripple signal compensator, coupled to the output terminal and the second terminal of the first transistor, and generating an adjusted ripple signal according to the switching voltage and the output signal;
   a ripple injection circuit, coupled to the ripple signal compensator, and generating a ripple injection signal according to the adjusted ripple signal,
   wherein the constant turned-on time signal generator generates the first driving signal and the second driving signal according to the ripple injection signal and a reference voltage.

2. The voltage converter as claimed in claim 1, wherein the ripple signal compensator generates a ramp signal according to the switching voltage and the output signal, and filters the ramp signal to generate a filtered ramp signal, and generates the adjusted ripple signal according to the ramp signal and the filtered ramp signal.

3. The voltage converter as claimed in claim 2, wherein the ripple signal compensator generates the adjusted ripple signal by subtracting the filtered ramp signal from the ramp signal.

4. The voltage converter as claimed in claim 2, wherein the ripple signal compensator comprises:
 a ramp signal generator, receiving the switching voltage and the output signal, and generating the ramp signal according to the switching voltage and the output signal;
 a low-pass filter, coupled to the ramp signal generator, and filtering the ramp signal to generate the filtered ramp signal; and
 a subtractor, coupled to the low-pass filter, and subtracting the filtered ramp signal and the ramp signal to generate the adjusted ripple signal.

5. The voltage converter as claimed in claim 1, further comprising:
 a comparator, having a first input terminal and a second input terminal for respectively receiving the reference signal and the ripple input signal, comparing the reference voltage and the ripple injection signal to generate a comparison result, and transmitting the comparison result to the constant turned-on time signal generator,
 wherein the constant turned-on time signal generator generates the first driving signal and the second driving signal according to the comparison result.

6. The voltage converter as claimed in claim 5, further comprising:
 an amplifier, having a first input terminal receiving the reference voltage, a second input terminal receiving the ripple injection signal, and an output signal coupled to the first input terminal of the comparator; and
 a capacitor, connected in series between the output terminal of the amplifier and the reference ground terminal.

7. The voltage converter as claimed in claim 1, wherein the ripple injection circuit generates a ramp current according to the adjusted ripple signal, and generates the ripple injection signal according to the ramp current.

8. The voltage converter as claimed in claim 7, wherein the ripple injection circuit comprises:
 a transconductance amplifier, having an input terminal receiving the output signal, another input terminal coupled to the reference ground terminal, and an output terminal generating the ramp current;
 a capacitor, having a first terminal coupled to the output terminal of the transconductance amplifier and the constant turned-on time signal generator, a second terminal coupled to the reference ground terminal, and the capacitor receiving the ramp current and generating a ramp voltage at the first terminal;
 a reset switch, coupled in parallel to the capacitor, and turned on or turned off according to a control signal; and
 an adder, adding the ramp voltage and the output signal, generating the ripple injection signal.

9. The voltage converter as claimed in claim 1, wherein a time that the first transistor is turned on according to the first driving signal is constant.

10. The voltage converter as claimed in claim 1, further comprising:
 a capacitor, connected in series between the output terminal and the reference ground terminal.

\* \* \* \* \*